Patented July 25, 1939

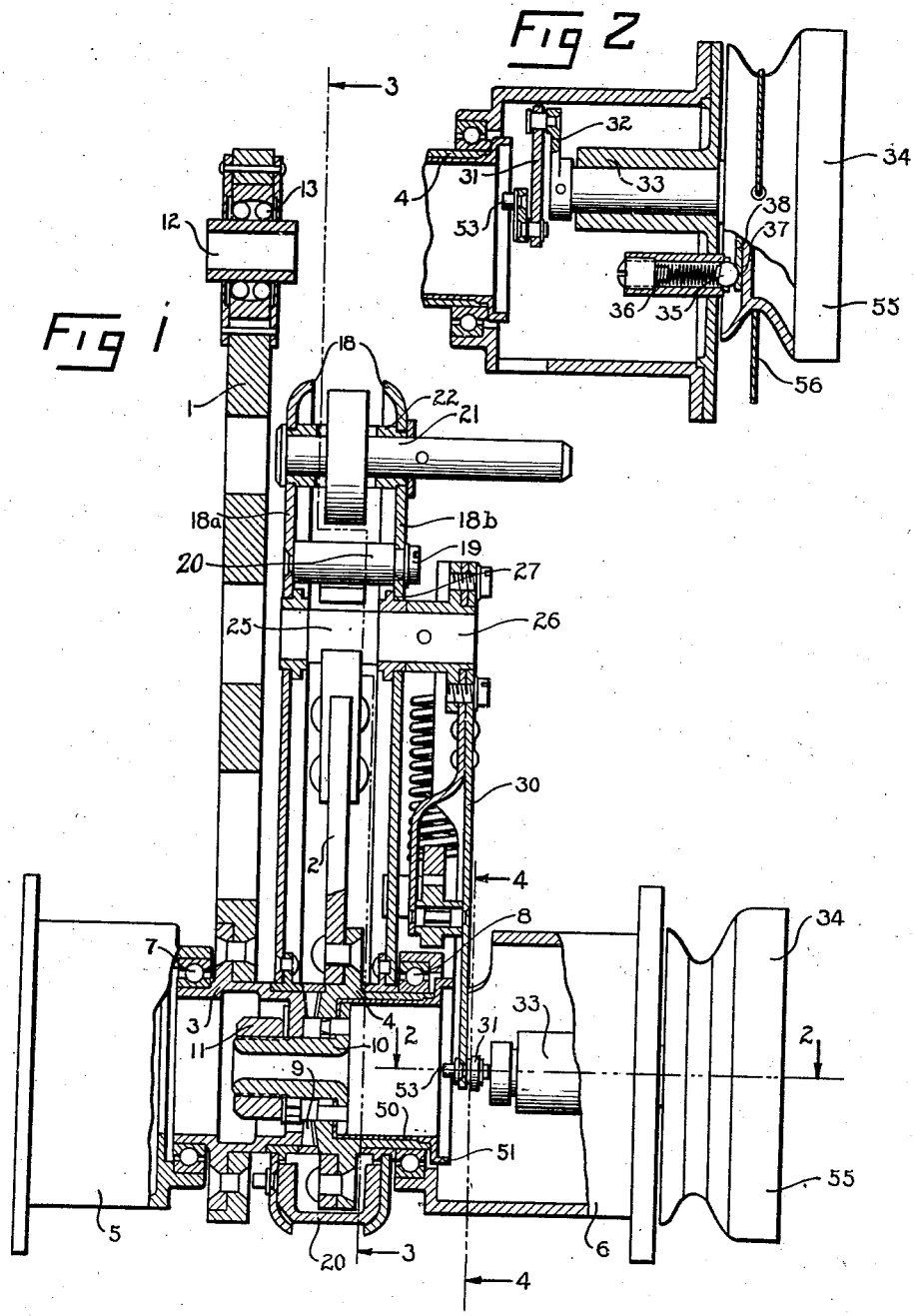

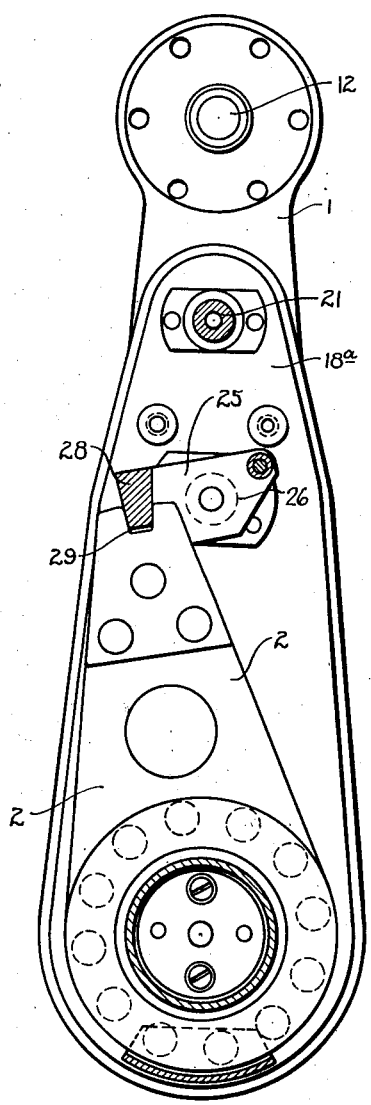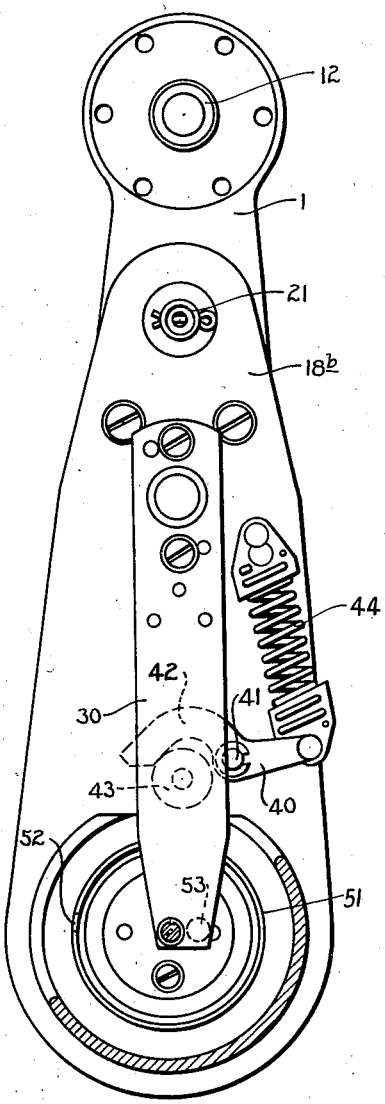

UNITED STATES PATENT OFFICE 2,167,421

2,167,421

AUTOMATIC CONTROL DEVICE FOR VEHICLES

Kurt Jann, Berlin-Charlottenburg, and Heinrich Roland, Berlin-Steglitz, Germany, assignors to Siemens Apparate und Maschinen Gesellschaft mit beschränkter Haftung, Berlin, Germany, a corporation of Germany Application October 7, 1937, Serial No. 167,860
In Germany October 17, 1936

6 Claims. (Cl. 74—469)

This invention relates to automatic control devices for vehicles and more particularly to a releasable coupling member for use between the servomotor and the control linkage for actuating the control elements of an aircraft.

An object of the invention is to provide an efficient, dependable and commercially practical device of the type above indicated.

Another object is to provide a device of the above type having novel and improved details of construction and combinations of parts.

Other and more specific objects will be apparent as the nature of the invention is more fully disclosed.

Although the novel features which are believed to be characteristic of this invention will be more particularly pointed out in the claims appended hereto, the invention itself will be better understood by referring to the following description, taken in connection with the accompanying drawings, in which a particular embodiment of the invention has been set forth for purposes of illustration.

In the drawings,

Fig. 1 is a longitudinal section through a coupling device constructed in accordance with the present invention;

Fig. 2 is a horizontal section taken along the line 2—2 of Fig. 1;

Fig. 3 is a transverse section taken along the line 3—3 of Fig. 1; and,

Fig. 4 is a transverse section taken along the line 4—4 of Fig. 1.

In the following description and in the claims certain specific terms are used for convenience in referring to various details of the invention. These terms, however, are to be given as broad an interpretation as the state of the art will permit.

Referring to the drawings more in detail, the coupling member is shown as comprising a pair of levers 1 and 2, secured to bushings 3 and 4, respectively, which are rotatably mounted in housings 5 and 6 by means of bearings 7 and 8, respectively. The bushings 3 and 4 are adjustably held together by means of a toothed gear coupling member 9 which is held in engaged position by means of a bolt 10 having a nut 11 thereon. When the members are securely held together by means of this bolt 10 and nut 11, the levers 1 and 2 move in unison about the bearings 7 and 8. The relative position of these levers, however, may be adjusted by loosening the nut 11 and shifting the levers with respect to the toothed gear coupling 9. The control linkage for controlling the control members of the aircraft, such as the rudder, may be attached to a bushing 12 which is journaled in bearings 13 in the lever 1.

A lever 18, comprising plates 18a and 18b, is journaled for movement about the bushings 3 and 4. The plates 18a and 18b are connected by a spacer bolt 19 and a spacing member 20 for movement in unison about the bushings 3 and 4. The servomotor may be connected to a shaft 21 which is journaled in suitable bearings 22 in the lever 18. The plates 18a and 18b are arranged on opposite sides of the lever 2 so that the lever 2 rotates therebetween.

A pawl 25, Fig. 3, is carried on a shaft 26 which is journaled in bearings 27 in the lever 18 and is provided with a projection 28 engaging a recess 29 in the lever 2 to securely lock the lever 2 and the lever 18 for movement in unison. For actuating the pawl 25 so as to release the coupling member and to permit free movement of the lever 18, there is provided an arm 30, Figs. 1 and 4, which is attached to the shaft 26 and is adapted to actuate the same. The free end of the arm 30 intersects the axis of the bushings 3 and 4 and carries a lever 31 (Fig. 2) which is attached to a crank 32 carried by a shaft 33 which is actuated by a knob 34 and is adapted to cause pivotal movement of the arm 30 about the axis of the shaft 26. The knob 34 is locked in its extreme operating positions by means of a ball 35 pressed by a spring 36 against a recess 37 formed in a plate 38 attached to said knob.

For normally holding the arm 30 in a position to cause the projection 28 of the pawl 25 to seat in the recess 29, there is provided a latch 40 (see Fig. 4) which is pivotally mounted on the plate 18b by a pin 41 and is provided with a curved finger 42 engaging a roller 43 attached to the arm 30. A tension spring 44 causes the finger 42 to apply pressure to the roller 43 tending to hold the arm 30 in locking position.

In order to prevent the movement of the arm 30 until the levers 2 and 18 are positioned with the projection 28 of the pawl 25 in alignment with recess 29, a sleeve 50 is mounted within bushing 4 and is provided with a flange 51 having a notch 52 formed therein. A pin 53 is attached to arm 30 in a position to pass through notch 52 when the parts are properly positioned. When the parts are not properly positioned, however, the pin 53 engages flange 51 and prevents further movement of arm 30. Pin 53 may also be used to pivotally mount the lever 31 on arm 30. It is to be understood, however, that a separate pin may be used for this purpose, if desired. Knob 34 may be provided with a surface 55 for manual operation and may be provided with a cable 56, such, for example, as a bowden wire for remote operation. It is to be understood that knob 34 may also be controlled from a remote point either electrically or pneumatically, as desired.

In the operation of this device, when the parts are locked for transmission of power, as shown in the drawings, the movement of the lever 18 caused by the servomotor acts through pawl 25 to cause corresponding movement of levers 2 and 1, the latter of which is connected to the control linkage for controlling the aircraft or the like in which the mechanism may be mounted. When it is desired to release the servomotor control, the knob 34 is rotated by any of the means above mentioned to shift the arm 30 in a direction to release projection 28 of pawl 25 from recess 29. The lever 18 is then free to move about bushings 3 and 4 and is entirely disconnected from levers 1 and 2. In this position the arm 30 has been actuated a sufficient distance so that pin 53 has passed through notch 52 in flange 51 and rides around the outer side of this flange.

When it is again desired to couple the servomotor to the control mechanism, knob 34 is actuated in the reverse direction, either manually or by the remote control means above mentioned. If levers 2 and 18 are properly aligned, pin 53 will pass through slot 52 in the flange 51 and will permit arm 30 to be returned to locking position. If the levers 2 and 18 are not properly aligned, pin 53 will strike against flange 51 and will prevent further movement of arm 30 until the elements have reached their proper relative positions. When arm 30 is returned to its locking position, as shown in Figs. 3 and 4, pawl 25 again locks the lever 18 to the lever 2 and causes levers 1, 2 and 18 to move as a unit for transmitting power from the servomotor to the control linkage. Latch 40 bearing against roller 43, as shown in Fig. 4, securely holds pawl 25 in locking position.

It will be noted that in this position the pin 53 lies in the axis of the bushings 3 and 4 so that the position of this pin with respect to bellcrank lever 31 is unchanged as arm 30 rotates with lever 18 about these bushings. Knob 34 can accordingly release the coupling mechanism in any angular position thereof but, due to pin 53 and notch 52, can only recouple the levers when they stand in their original relative positions.

While a specific embodiment of the invention has been shown for purposes of illustration, it is to be understood that the invention is capable of various uses and that various changes and modifications may be made therein as will readily appear to a person skilled in the art. The invention is only to be limited in accordance with the following claims when interpreted in view of the prior art.

What is claimed is:

1. A coupling device comprising a pair of levers rotatable about the same axis and adapted to be connected respectively to receive and transmit power, a pawl pivotally mounted on one of said levers, a member associated with the other of said levers and adapted to be engaged by said pawl for locking said levers for movement in unison, a pivoted arm adapted to control said pawl, the free end of said arm lying substantially in said axis when said arm is in locking position, a control means, and a linkage connecting said control said pawl between engaging and disengaging positions.

2. A coupling device comprising first and second levers rotatable about the same axis and adapted to be connected respectively to receive and transmit power, a third lever movable about said axis, means adjustably connecting said third lever to move in unison with said first lever, a pawl carried by said second lever and engaging said third lever to lock the same for movement in unison therewith, and means carried by said second lever to control said pawl for locking or releasing said coupling mechanism.

3. A coupling device comprising a housing, first and second levers rotatably mounted thereon, adjustable means interconnecting said levers for movement in unison, a third lever rotatably mounted on said housing and comprising plates disposed on opposite sides of said second lever, a pawl carried by said third lever and engaging said second lever for coupling the same for movement in unison therewith, an arm controlling said pawl, a rotating control member, and a linkage connecting said rotating control member to said arm for actuating the same.

4. A coupling device comprising a housing, first and second levers rotatably mounted thereon, adjustable means interconnecting said levers for movement in unison, a third lever rotatably mounted on said housing and comprising parts disposed on opposite sides of said second lever, a pawl carried by said third lever and engaging said second lever for coupling the same for movement in unison therewith, an arm controlling said pawl, a rotating control member, and a linkage connecting said rotating control member to said arm for actuating the same, and means preventing movement of said arm for coupling said levers except when said levers are in predetermined relative positions.

5. A coupling device comprising a housing, first and second levers rotatably mounted thereon, adjustable means interconnecting said levers for movement in unison, a third lever rotatably mounted on said housing and comprising parts disposed on opposite sides of said second lever, a pawl carried by said third lever and engaging said second lever for coupling the same for movement in unison therewith, an arm controlling said pawl, a rotating control member and a linkage connecting said rotating control member to said arm for actuating the same, and cooperating means carried by said arm and said second lever to prevent movement of said arm for coupling said second and third levers except when said levers are in predetermined relative positions.

6. A coupling device comprising a pair of levers rotatable about the same axis and adapted to be connected respectively to receive and transmit power, a pawl pivotally mounted on one of said levers, a member associated with the other of said levers and adapted to be engaged by said pawl for locking said levers for movement in unison, an arm adapted to control said pawl, the free end of said arm lying substantially in said axis when said arm is in locking position, a control means and a linkage connecting said control means to the free end of said arm for shifting said pawl between engaging and disengaging positions, a pin carried by said arm and a flange associated with said other lever having a notch adapted to pass said pin only when said levers are in predetermined relative positions, whereby coupling movement of said arm is prevented except when said levers are in said positions.

KURT JANN.
HEINRICH ROLAND.